N. & L. HEWIT.
CORN HUSKER.
APPLICATION FILED MAY 18, 1912.

1,068,130.

Patented July 22, 1913.

2 SHEETS—SHEET 1.

Witnesses

Inventors
L. Hewit
N. Hewit

By
Attorneys.

N. & L. HEWIT.
CORN HUSKER.
APPLICATION FILED MAY 18, 1912.
1,068,130.
Patented July 22, 1913.
2 SHEETS—SHEET 2.
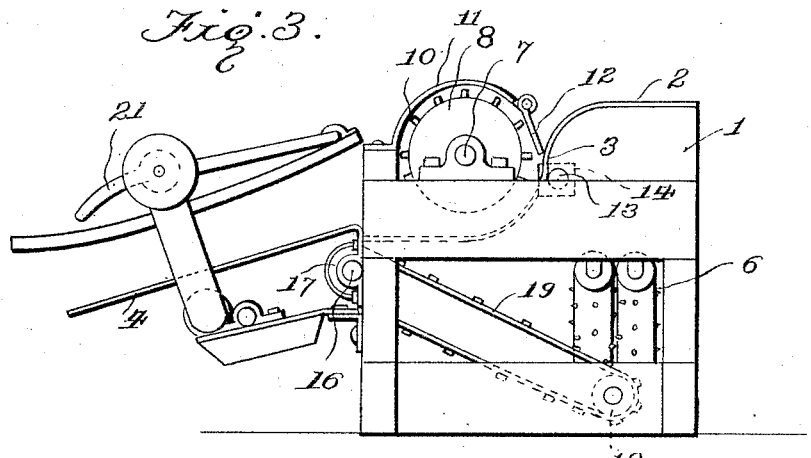
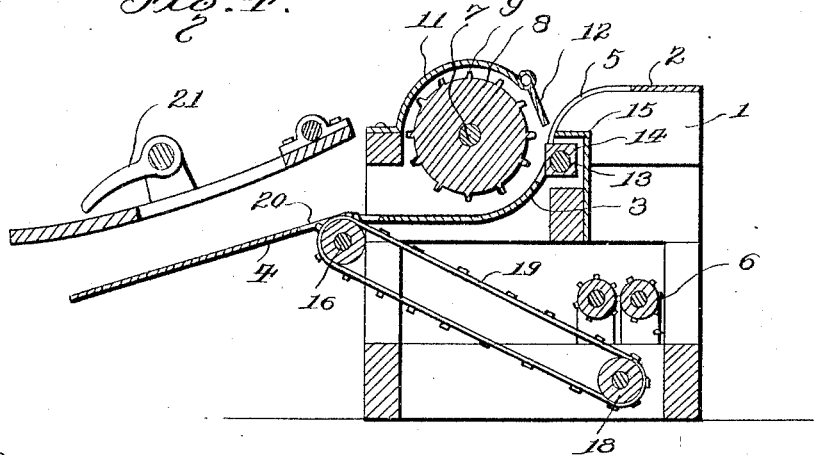
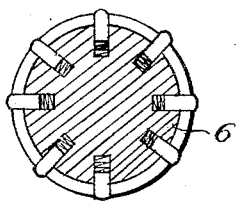
Inventors
L. Hewit
N. Hewit
Witnesses
By
Attorneys.

UNITED STATES PATENT OFFICE.

NICK HEWIT AND LYMAN HEWIT, OF SEVILLE, OHIO.

CORN-HUSKER.

1,068,130.	Specification of Letters Patent.	Patented July 22, 1913.

Application filed May 18, 1912. Serial No. 698,299.

*To all whom it may concern:*

Be it known that we, NICK HEWIT and LYMAN HEWIT, citizens of the United States, residing at Seville, in the county of Medina and State of Ohio, have invented certain new and useful Improvements in Corn-Huskers, of which the following is a specification.

This invention has relation to corn huskers, and has for its object to provide a machine of simple structure which is adapted to receive stalks of corn with the ears thereon sidewise. The stalks, with the fodder attached thereto, are passed through the machine without separating or tearing the fodder from the stalks, while means are provided for snapping the ears from the stalks and permitting them to gravitate upon suitable husking rolls with which the machine is provided. The stalks, after they have been relieved of the ears and with the fodder still adhering thereto, are collected and tied in bundles by mechanisms similar to those used upon ordinary grain binders.

Figure 1:
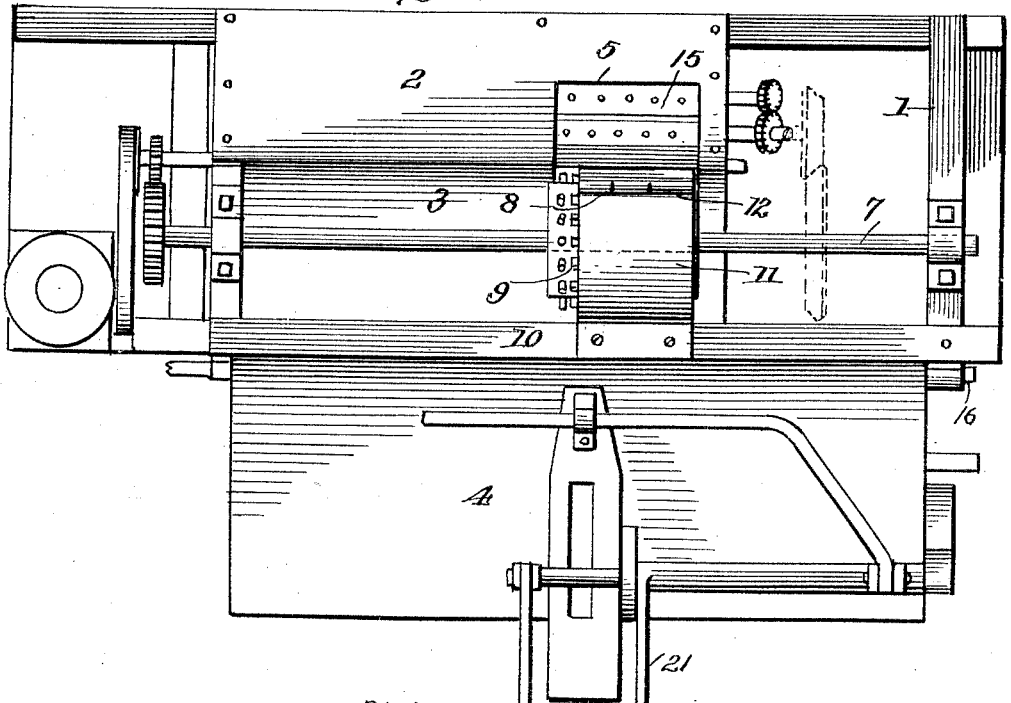
Figure 2:
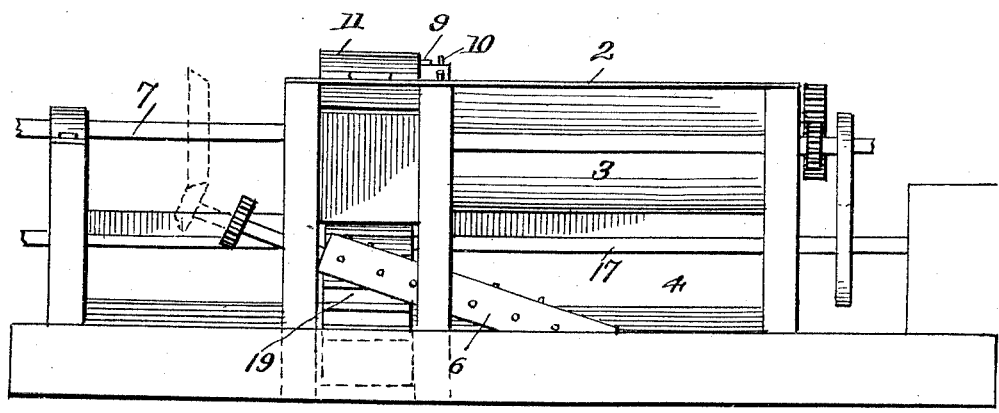

For a full understanding of the invention, reference is to be had to the following description and accompanying drawings in which:

Figure 1 is a top plan view of the husker; Fig. 2 is a side elevation of the same; Fig. 3 is an end elevation of the same; Fig. 4 is a transverse sectional view of the same; Fig. 5 is a transverse sectional view of one of the husking rolls.

Corresponding and like parts are referred to in the following description and indicated in all the views of the accompanying drawings by the same reference characters.

The machine consists of a frame 1 which is provided with a platform 2. The platform extends downwardly and is continued into a chute 3 at the lower edge of which is located a deck 4. The platform 2 is provided at one end portion with an opening 5. Husking rolls 6 are journaled for rotation below the platform 2 and are in inclined positions with their upper ends below the opening 5. These husking rolls may be of any usual or desired pattern and are rotated toward each other in the usual manner. A shaft 7 is journaled upon the frame 1 above the chute 3, and is provided with a snapping roll 8 which is located opposite the opening 5 in the platform 2. This snapping roll is preferably cylindrical and is of relatively large diameter. It is provided upon its periphery with a series of spaced cleats 9, the ends of which terminate short of the ends of the roll. Pins 10 are mounted upon the periphery of the roll 8 beyond the ends of the cleats 9. A hood 11 is mounted upon the frame 1 and extends over the cleats 9 with one end portion disposed opposite the opening 5 in the platform 2. A fender 12 is hinged to the edge of the hood 11 which is nearest the opening 5, and the said fender hangs approximately in a vertical position along that side of the snapping roll 8 which is nearest to the said opening 5. A shaft 13 is journaled upon the frame 1 and carries a snapping roll 14 which is of relative small diameter. This roll 14 is located at the lower portion of the opening 5, and a shield 15 is mounted upon the frame 1, its upper portion extending over the upper part of the snapping roll 14. A shaft 16 is journaled upon the frame 1 under the deck 4 and is provided with a roller 17. A roller 18 is journaled under the husking rolls 6. A belt 19 is trained around the rolls 17 and 18, and the upper run of the said belt is adapted to move from under the husking rolls 6 toward the deck 4. This belt is adapted to carry husks, after they have been removed from the ears, from under the husking rolls and deposit the same through an opening 20 with which the deck 4 is provided upon the upper side of the deck in the vicinity of the upper edge thereof. A bundle tying and bundle ejecting mechanism, indicated generally at 21, is arranged to operate from the deck, and as this mechanism is of the usual pattern employed in grain binders and forms no part of the present invention, a further description of the same is unnecessary.

An engine 22 may be mounted upon the frame 1 or may be located in close proximity thereto, and is operatively connected in any suitable manner with the shaft 7.

The parts of the machine are operatively connected with the shaft 7 by means of chain belts or inter-meshing gear wheels in any suitable manner.

In operation, the stalks of the fodder and the ears thereon are laid upon the platform 2, and the said stalks are permitted to pass sidewise down the chute 3. The ears are directed through the opening 5 in the platform 2. The stalks pass between the snapping rolls 8 and 14, and the pins 10 engage the stalks and the fodder and carry the stalks and fodder down along the chute 3. When the ears arrive at the shield 15 and the fender 12, the shanks of the ears are pinched between the cleats 9 and the corner portion of the snapping roll 14, and thus the ears are snapped from the stalks and they fall upon the upper ends of the husking rolls 6 where the husks are removed. The ears slide down the husking rolls while the husks pass between the rolls and fall upon the upper run of the belt 19. The said belt carries the husks to the deck 4. After a sufficient quantity of stalks and husks have been collected upon the deck, the bundle tying mechanism indicated at 21 operates and the said material is bound in the form of a bundle, and the bundle is then ejected from the deck in the usual manner. Therefore it will be seen that a machine of simple structure is provided and that the stalks with the fodder thereon may be passed through the machine without shredding or tearing the fodder or removing the same from the stalks. The bundle material may be used for forage, and the ears are denuded and may be used for feed or are in fit condition for shelling.

Having described the invention, what is claimed as new is:

1. A machine of the character set forth comprising a platform having an opening in one end, a snapping roll mounted below said opening and angular in cross section, a larger snapping roll mounted in spaced relation to the platform adjacent said opening and provided on its periphery with longitudinal spaced cleats adapted to co-act with the smaller angular snapping roll.

2. A machine of the character set forth comprising a platform, a chute leading therefrom, a snapping roller disposed between the platform and the chute, a larger snapping roller arranged above the chute and in spaced relation to the platform, a deck extending from the chute and having an opening adjacent thereto, husking rollers disposed below the platform and in advance of the snapping rollers, and a conveyer leading upwardly from below the husking rollers to the said opening in the deck.

3. In a machine of the character described, journaled snapping rolls one of which is of relatively great diameter and provided upon its periphery with spaced cleats and pins located beyond the ends of the cleats, the other being of relatively small diameter and angular in transverse section.

4. In a machine of the character described, journaled husking rolls one of which is of relatively great diameter and provided upon its periphery with work engaging members, a hood extending over said roll and provided with a hinged fender, the other roll being of relatively small diameter and angular in transverse section, and a shield extending over the smaller roll.

5. In a machine of the character indicated, journaled snapping rolls one of which is of relatively great diameter and the other of relatively small diameter, a platform having an opening located opposite the snapping rolls, the larger snapping roll having upon its periphery spaced cleats and pins located beyond the ends of the cleats, a hood extending over the larger snapping roll, a fender hinged to the hood and located opposite the opening of the platform, and a shield extending over the smaller snapping roll.

In testimony whereof we affix our signatures in presence of two witnesses.

NICK HEWIT. [L. S.]
LYMAN HEWIT. [L. S.]

Witnesses:
FREDRICK C. BAUER,
HERBERT F. IMMEL.

---

Copies of this patent may be obtained for five cents each, by addressing the "Commissioner of Patents, Washington, D. C."